United States Patent
Korotaev

(10) Patent No.: US 11,263,295 B2
(45) Date of Patent: Mar. 1, 2022

(54) SYSTEMS AND METHODS FOR INTRUSION DETECTION AND PREVENTION USING SOFTWARE PATCHING AND HONEYPOTS

(71) Applicant: Cloud Linux Software Inc., Estero, FL (US)

(72) Inventor: Kirill Korotaev, Moscow (RU)

(73) Assignee: Cloud Linux Software Inc., Estero, FL (US)

(*) Notice: Subject to any disclaimer, the term of this patent is extended or adjusted under 35 U.S.C. 154(b) by 296 days.

(21) Appl. No.: 16/504,508

(22) Filed: Jul. 8, 2019

(65) Prior Publication Data

US 2021/0011985 A1    Jan. 14, 2021

(51) Int. Cl.
| | | |
|---|---|---|
| *G06F 21/12* | (2013.01) | |
| *G06F 21/57* | (2013.01) | |
| *H04L 29/06* | (2006.01) | |

(52) U.S. Cl.
CPC ........ *G06F 21/126* (2013.01); *H04L 63/1416* (2013.01); *H04L 63/1491* (2013.01); *G06F 21/57* (2013.01); *G06F 2221/0735* (2013.01)

(58) Field of Classification Search
CPC ........... G06F 21/126; G06F 2221/0735; G06F 21/12; G06F 21/57; H04L 63/1416; H04L 63/1491; H04L 29/06
See application file for complete search history.

(56) References Cited

U.S. PATENT DOCUMENTS

| | | | |
|---|---|---|---|
| 7,412,723 B2 | 8/2008 | Blake et al. | |
| 7,904,959 B2 | 3/2011 | Sidiroglou et al. | |
| 8,181,250 B2 | 5/2012 | Rafalovich et al. | |
| 8,448,247 B2 | 5/2013 | Stute | |
| 8,549,642 B2 | 10/2013 | Lee | |
| 9,350,758 B1 | 5/2016 | Aharoni et al. | |
| 9,923,922 B1 | 3/2018 | Brown et al. | |
| 2006/0161982 A1* | 7/2006 | Chari | G06F 21/53 726/23 |
| 2007/0180509 A1* | 8/2007 | Swartz | G06F 9/4406 726/9 |
| 2008/0141374 A1* | 6/2008 | Sidiroglou | G06F 21/554 726/23 |
| 2011/0126288 A1* | 5/2011 | Schloegel | G06F 21/577 726/25 |
| 2014/0137257 A1* | 5/2014 | Martinez | H04L 63/1433 726/25 |
| 2016/0323301 A1* | 11/2016 | Boss | G06F 21/554 |
| 2017/0339186 A1 | 11/2017 | Gurvich et al. | |
| 2018/0146002 A1* | 5/2018 | Canfield | H04L 63/1491 |
| 2019/0052675 A1* | 2/2019 | Krebs | H04L 63/1416 |

* cited by examiner

*Primary Examiner* — Jayesh M Jhaveri

(74) *Attorney, Agent, or Firm* — Arent Fox LLP; Michael Fainberg

(57) ABSTRACT

A variety of methods are provided for an application or operating system (OS) kernel intrusion detection and prevention, based on usage of existing vulnerability fixes and their transformation into honeypot detectors. A honeypot patch may be generated for a computing system associated with a software vulnerability in software installed on the computing system. The honeypot patch, when used to modify the installed software, can convert the computing system into a honeypot system configured to detect attempts to exploit the software vulnerability of the software, and in response, generate a security event associated with the software vulnerability.

17 Claims, 4 Drawing Sheets

SYSTEMS AND METHODS FOR INTRUSION DETECTION AND PREVENTION USING SOFTWARE PATCHING AND HONEYPOTS

FIELD OF TECHNOLOGY

The present disclosure relates generally to the field of computer security, more specifically, to systems and methods of intrusion detection and prevention using software patching to create honeypots.

BACKGROUND

Security of live IT software systems was always a challenge. Keeping Operating System (OS) and applications up to date, protecting systems with firewall, web application firewalls and other anomaly or intrusion detection systems help to some extent and makes intruder life harder, yet will never solve the problem.

Looking more deeply to Intrusion Detection Systems (IDS) and Intrusion Prevention Systems (IPS) one may find a lack of collaboration and deep integration between these systems and systems being protected. Generic IDS system may detect statistical behavior anomalies, leading to false positives or follow a set of strict rules, which makes it hard to configure for real life large systems and update as this software evolves over time. Such systems may also exploit honeypot techniques and detect access to fake resources, which should not be normally accessed at all, but intruders are scanning to find further vectors of attacks and thus reveal themselves. Comprehensive honeypots may even provide fake vulnerabilities or vulnerable systems to make attacker spend efforts on those rather than on real systems.

Typical honeypots and IDS/IPS systems are deployed as separate machines, firewalls, or resources on the network, which make it tricky for mass deployment and management by non-professionals. There is also a class of IPS systems running right on the protected systems and traditionally called Anti-Virus software, typically based both on pattern/rule matching and behavioral analysis.

To describe in more details, most of the state of the art and security honeypot techniques are related to the computer networking and network traffic. Some approaches have used a virtual honeypot that is exposed to a network using a security appliance that relays network traffic directed to the virtual honeypot from the security appliance to a server for processing. Other approaches have used scattered IP addresses in a cloud infrastructure. To protect existing systems all non-authorized traffic can be as early as possible routed to production like honeypot servers to detect and mislead attacks. Honeypots can mimic such production servers, and can have similar or special OS, version, etc. Honeypots can also be useful in detecting, handling, or filtering DDoS network attacks. Besides honeypots, many IDS systems perform network traffic analysis to the target systems and filter out malicious requests.

But not only IP addresses and TCP/UDP ports can serve as honeypots detecting scanning of the network infrastructure by an attacker. Much more advanced network systems simulating real-life applications and detecting anomaly access patterns like Active Directory may serve such a purpose, such as in approaches in which a honeypot in a computer network is configured for use with a wide variety of computing resources that are defined by a network administrator or user which may include desktop and network resources such as address book contacts, instant messaging contacts, active directory user accounts, IP addresses, and files that contain particular content or that are stored in particular locations. Such honeypot applications can be fake ones or real services with real vulnerabilities. Even trickier honeypot objects can include a decoy e-mail addresses associated with the spam e-mail honeypot that do not, or no longer, belong to a genuine person or entity. Consequently, such decoy email addresses typically do not receive legitimate e-mails from legitimate senders may be detected using honeypot systems that identify potential malware containing messages whereby a decoy system to receive illegitimate e-mails is established.

Yet only a few methods are available to protect against local code vulnerability attacks. Some of modern programming languages (but C/C++, which are used for OS kernels and other performance critical software) has protection against out of array boundaries access. Stack overflow protection is handled now days best and can be even protected against compile time for C/C++ with fstack-protector GCC. And the worst situation in system programming languages is with "use after free" patterns which incur huge performance penalty if mitigated in runtime (e.g. kernel has an option to unmap unused memory pages and user space applications can be compiled with address sanitizer library or run under valgrind-style supervision—none of these options used in production). OS security systems like SELinux and other Expert systems (also known as rule-based systems or production systems) are difficult to use and configure. Accordingly, there is a need for improvements within in the computer security arts for local-application and kernel intrusion detection and protection.

SUMMARY

The present disclosure relates to the methods of intrusion detection and prevention that substantially obviates one or several of the disadvantages of the related art.

Embodiments of the present disclosure include techniques such as using previously known and fixed security vulnerabilities as honeypots, i.e. scattered all around detectors of system being tried to exploit and intrusion attempts. Similar to widely used methods of deploying fake network resources acting as honeypots and detecting an attacker presence in the network or even attracting him, such already fixed software vulnerabilities can directly signal about a malicious user trying to attack the software from inside. It may also be a signal that system has already been exploited, and attacker is trying to gain even more control over it probing new vectors of attacks. Such honeypots do not require additional hardware or separate network machines and can be easily integrated into existing OS and applications by the vendors or applied to a stock system by using live update technologies.

All the Intrusion Detection methods of the present disclosure can be used for Intrusion Prevention based on selected reaction of the system. It can be a signal to the administrator about the incident details or a more proactive reaction like termination of the user processes performing the attack attempts or even blocking incoming connections from IP addresses spawned these processes.

According to an exemplary aspect of the present disclosure, a method is provided for software intrusion detection. The method includes generating a honeypot patch for a computing system associated with a software vulnerability in a software installed on the computing system, wherein the software comprises at least one of an application and an operating system. The honeypot patch is configured to convert the computing system associated with the software vulnerability into a honeypot system configured to detect attempts to exploit the software vulnerability of the software, and in response, generate a security event associated with the software vulnerability. The method includes modifying the software installed on the computing system using the generated honeypot patch.

In another aspect, modifying the software installed on the computing system using the generated honeypot patch further includes modifying original source code of the software using the honeypot patch; and restarting execution of the software using an executable created by re-compiling the modified source code.

In another aspect, modifying the software installed on the computing system using the generated honeypot patch further includes generating a live patch based on the generated honeypot patch, wherein the live patch is configured to modify code of the software being executed without restarting the software.

In another aspect, the honeypot patch includes computer-executable instructions configured to detect the attempt to exploit the software vulnerability of the software using a conditional test for verifying security capability to be inserted into the original source code of the software.

In another aspect, the honeypot patch includes computer-executable instructions configured to detect the attempt to exploit the software vulnerability of the software using a conditional test for whether the attempt is to cause a buffer overflow.

In another aspect, the software vulnerability may include a memory use after free. In such aspects, the honeypot patch may include computer-executable instructions configured to detect the attempt to exploit the software vulnerability of the software by: marking a data structure with a predetermined placeholder value; and verifying that the data structure does not contain the predetermined placeholder value.

In another aspect, the software vulnerability may include a race condition. In such aspects, the honeypot patch includes computer-executable instructions configured to detect the attempt to exploit the software vulnerability of the software using a set of conditional tests leading up to the race and software state manipulation.

In another aspect, the honeypot system configured to detect attempts to exploit the software vulnerability of the software is further configured to report the exploit attempts to a system administrator via a notification.

In another aspect, the honeypot system is further configured to, in response to detecting attempts to exploit the software vulnerability of the software, kill and block intruder processes.

In another aspect, the honeypot system is further configured to, in response to detecting attempts to exploit the software vulnerability of the software, save a state of processes running on the honeypot system for further analysis.

In another aspect, the honeypot system is further configured to, in response to detecting attempts to exploit the software vulnerability of the software, live migrate processes associated with the detected attack to an isolated system or a virtual machine.

In another aspect, current or future connections from an attacking address are routed to the isolated system or the virtual machine where the processes were migrated.

In another aspect, the honeypot system is further configured to, in response to detecting attempts to exploit the software vulnerability of the software, block a login of a user associated with the detected attack.

In another aspect, the honeypot system is further configured to, in response to detecting attempts to exploit the software vulnerability of the software, block at least a portion of network traffic from an original network address associated with the detected attack.

In another aspect, the honeypot system is further configured to, in response to detecting attempts to exploit the software vulnerability of the software, fake to the attacker that the detected attack was successful.

In one exemplary aspect of the present disclosure, a system for software intrusion detection. The system includes a hardware processor configured to generate a honeypot patch for a computing system associated with a software vulnerability in a software installed on the computing system, wherein the software comprises at least one of an application and an operating system. The honeypot patch is configured to convert the computing system associated with the software vulnerability into a honeypot system configured to detect attempts to exploit the software vulnerability of the software, and in response, generate a security event associated with the software vulnerability. The processor is further configured to modify the software installed on the computing system using the generated honeypot patch.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for software intrusion detection and prevention using software patching and honeypots. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
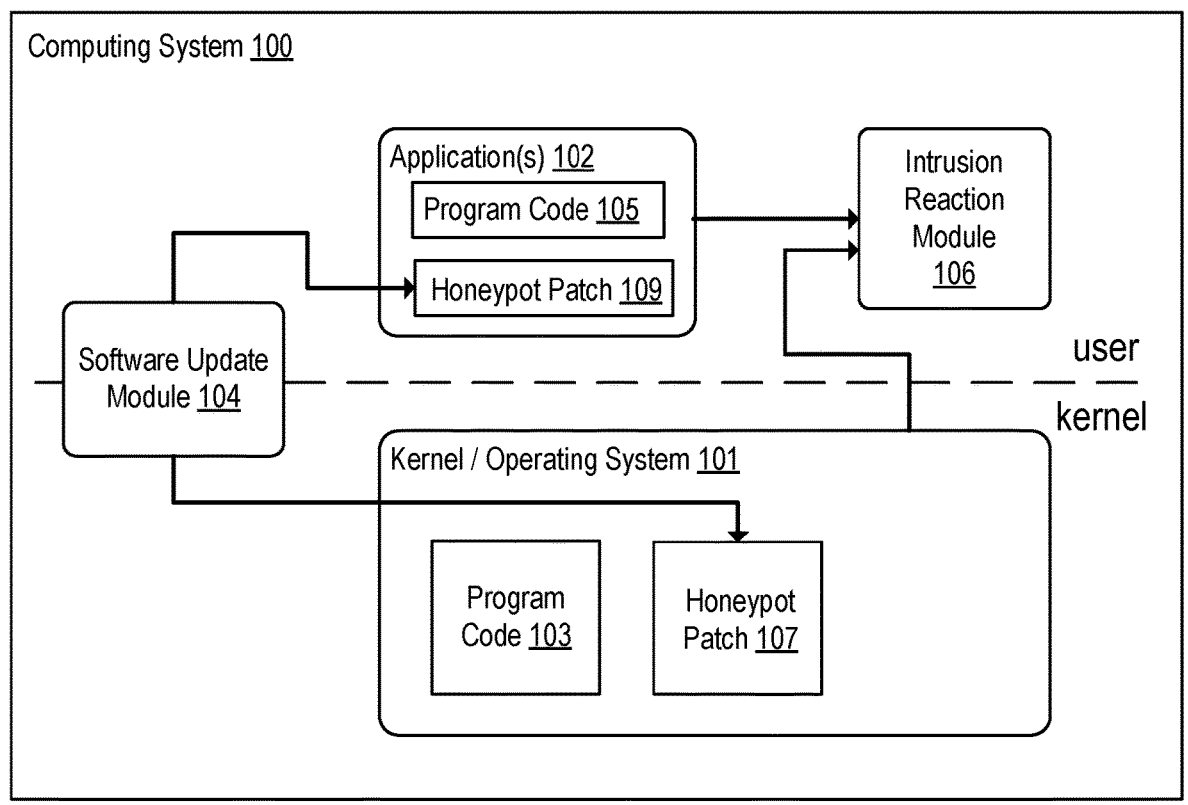
FIG. 1 is a block diagram illustrating a computing system for software intrusion detection according to an exemplary aspect.

FIG. 1 is a block diagram illustrating a computing system 100 for software intrusion detection according to an exemplary aspect. The computing system 100 includes an operating system (OS) 101, which is interchangeably referred to as a kernel, and applications 102 installed thereon. The OS 101 is a type of system software configured to manage the execution of applications 102 and computer hardware resources of the computing system 100, and may include common system services configured to facilitate such execution and management. The operating system 101 and applications 102 may be referred to collectively as the software of the computing system 100. The computing system 100 may be any computing device, physical server, computer server, desktop, laptop, handheld device, tablet device, smartphone, or any other electronic device suitable for executing software program code as described herein.

It is understood that existing large, commercial software, including OS 101 and applications 102, can have many subsystems, APIs, and different security models implemented inside and a large code base, which makes it difficult for any human being to verify correctness and security safety of the software in question. This intrinsic complexity of modern software makes it likely that security issues are discovered over the time by security experts as well as hackers. Those discovered by security experts and software developers are fixed, mostly becoming disclosed to the public via bulletins and are assigned security identifiers (e.g. CVE IDs). However, a large set of software vulnerabilities might be left unknown to security experts and developers, but known to malicious users only. Thus, a set of software security issues can be divided into known (and patchable) issues and issues that are not patched but might be known to malicious actors.

The first set of known and fixed vulnerabilities provides a hint of what can go wrong and exploited by an attacker. Rather than simply patch a vulnerable system to remove the vulnerability, aspects of the present disclosure are configured to use existing vulnerable systems as an intrusion attack detector or a type of "honeypot" for future intrusion/attack detection and for making a possible attacker believe their attack was successful. This is particularly useful in scenarios in which the situation exploited is abnormal (i.e., the vulnerability is rarely triggered under normal operations) and is simple to detect. A honeypot refers to a type of system that has been configured to be attractive to malicious actors (i.e., software, users). When malicious actors attempt to exploit a honeypot, their attention may be diverted away from other systems (i.e., legitimate, production systems). Moreover, the malicious activity performed on the honeypot may be analyzed/recorded for computer security purposes.

According to an aspect, the system 100 may include a software update module 104 and an intrusion reaction module 106. The software update module 104 may be configured to generate software patches, referred to herein as honeypot patches, that are configured to convert a computing system that currently has or previously had (i.e., associated with) a particular software vulnerability into a honeypot system. A honeypot system is configured to, by execution of the modified software, detect attempts to exploit the particular software vulnerability, and in response to detecting such an attempt, generate or trigger a security event associated with the software vulnerability. The intrusion reaction module 106 is configured to detect, receive, and/or intercept the generated security event(s) and to react accordingly to the exploit attempts detected by the honeypot patch.

A software vulnerability can be manifested in by programming bugs, design flaws, omissions of security checks or input validation, and other types of software errors. Rather than simply fix a software vulnerability, the honeypot patch replaces (or adds to) the program code that encompasses the software vulnerability with program code designed to detect purposeful attempts to exploit the software vulnerability. The honeypot patch may contain program code for enabling a resulting honeypot system to address a single software vulnerability or multiple software vulnerabilities at once. In some aspects, the honeypot patch is created as a "live" patch that is applied to the original running software system using live patching techniques (also referred to as hot patching or dynamic software updates) without need for its restart. In some aspects, the honeypot patch is applied to original software code of the software (e.g., kernel source code, application source code), which is then re-compiled (e.g., into a new executable binary), and the software is restarted using the new modified version or the system is rebooted/restarted.

In one aspect, the honeypot patch can be implemented with a live update binary that is generated as follows. Program code that is configured to detect attempts to exploit a software vulnerability is merged with the original source code of the (still vulnerable or fixed) software to form modified source code. For example, we can take a latest operating system release where a vulnerability has been closed and add a honey pot patch to it, or if a computer operating system was not updated and is running an old vulnerable version, we can fix the vulnerability and add a honeypot patch.

A software build system is modified to make a compilation go through via intermediate stage, rather than directly to final object code (i.e., before generating final object code we may have intermediate stages with non-final object code). An analysis and comparison of the original and the modified intermediate (assembler, object or some other Intermediate Representation—IR) code results in the generation of the new, "Instrumented" intermediate (assembler, object or other IR) code. This instrumented intermediate (assembler, object or other IR) code is constructed in such a way that, if compiled and/or linked, it produces the resulting file with optionally the original binary code and a code for the honeypot update (which may address the software vulnerability if applied to vulnerable versions of the software and adds detection capability) in the very same file, including the information about which original code blocks should be replaced with new ones. The resulting file can be an object file (e.g., a Linux ELF file or some other platform-specific object file) with relocations information and sections. This technique and other examples of similar techniques for creating a live update is described in further detail in U.S. Pat. No. 9,696,989, which is herein incorporated by reference, and can be extended for use in creating a honeypot patch for modifying vulnerable software systems into honeypot systems.

In one aspect, the software update module 104 may be arranged in a two-component form, comprised of a patch management subcomponent and an update subcomponent. The patch management subcomponent (e.g., executing in user-level space) may be configured to create or retrieve from a predetermined library or data store one or more honeypot patches based on software vulnerabilities detected on the existing applications and/or operating system. The update subcomponent (e.g., executing as a kernel module) may be configured to execute a live patching mechanism that alters the workings of the operating system kernel 101 and/or the user applications 102 as they are executing without requiring a restart of the software. Aspects of the present disclosure extend to other configurations of the software update module 104, including a single monolithic system service (e.g., executing in privileged or user level) or a micro-service based configuration.

In general, the term "module" as used herein can refer to a software service or application executed as part of the operating system 101. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Figure 2A:
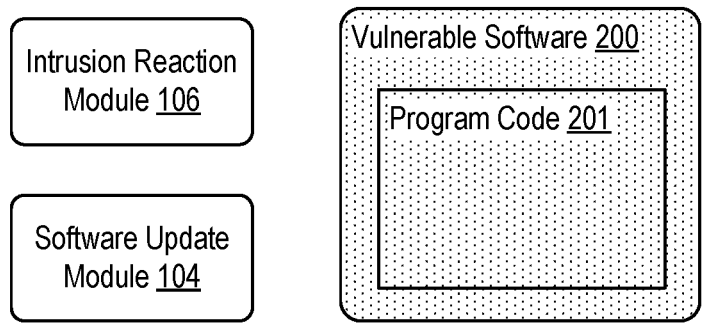
FIGS. 2A to 2C are block diagrams illustrating operations for the intrusion detection and prevention system based on honeypots, where honeypot detector reports about intrusion attempts to a reaction module according to an exemplary aspect.
Figure 2B:
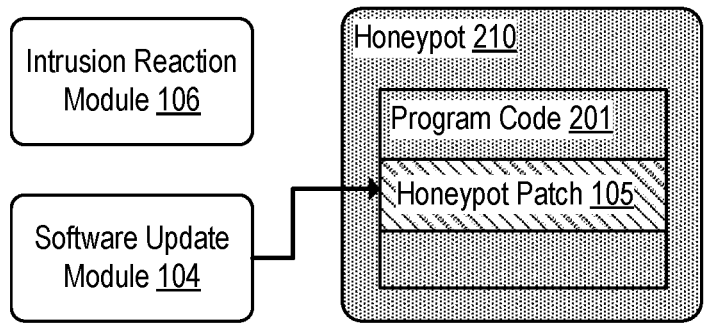
Figure 2C:
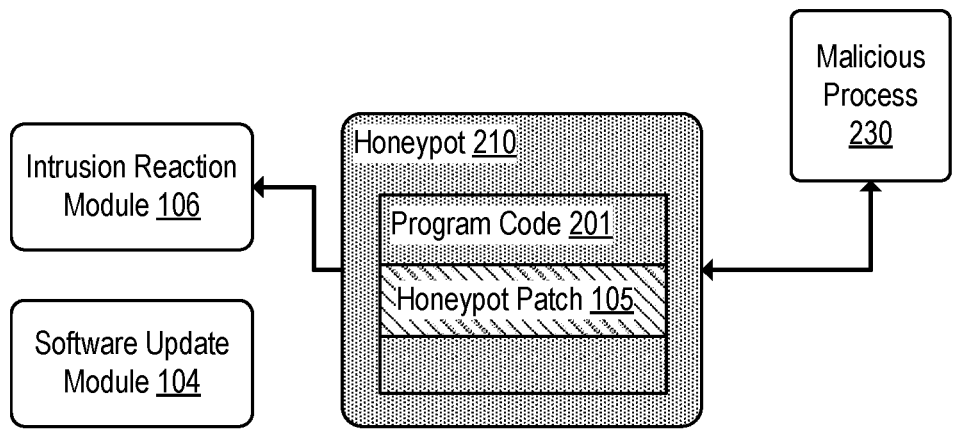

FIGS. 2A to 2C are block diagrams illustrating operations for the intrusion detection and prevention system based on honeypots, where honeypot detector reports about intrusion attempts to a reaction module according to an exemplary aspect. As shown in FIG. 2A, the software update module 104 may detect the existence of (running) vulnerable software 200 comprised of program code 201 that contains a known software vulnerability. In some aspects, the software update module 104 may detect the software 200 has a software vulnerability based on a comparison of the software with a library or data store of known software vulnerabilities and known affected software. For example, the software update module 104 may check identifiers or other metadata associated with the software 200 (e.g., software name, software publisher, version number) against the library of known software vulnerabilities. For example, the software update module 104 may determine that the installed software 200 is a version of the software that contains a known software vulnerability according to the library. In another example, the software update module 104 may determine that the software 200 is an updated version of the operating system that is already patched against the particular software vulnerability and takes no further action. In an alternative aspect, the software update module 104 may determine that the software 200 is an updated version of the operating system that is already patched against the particular software vulnerability but for which a honeypot patch is available and compatible. That is, the program code and architecture of the installed instance of the software is such that the software vulnerability has been fixed and the program code of the honey patch is still compatible enough to be inserted into the software.

One class of software issues that can be turned into honeypots is a lack of security capabilities verification in the code of the software. In one aspect, the software update module 104 may generate a honeypot patch based on detection of the software 200 associated with a software vulnerability related to an omitted security check in the code of the software 200. In one example of such a vulnerability, a software vulnerability corresponding to the security bulletin CVE-2017-17448 exists in a certain version of the Linux kernel (e.g., up to version 4.14.4), in which a certain library file (e.g., net/netfilter/nfnetlink_cthelper.c) does not require the CAP_NET_ADMIN capability for new, get, and del operations, which allows unprivileged users to bypass intended access restrictions because the nfnl_cthelper_list data structure is shared across all net namespaces. The software update module 104 may generate a honeypot patch that comprises computer-executable code that fixes this vulnerability by adding the missing user capabilities verification and by adding signaling if an unprivileged user is trying to access this API. It has been determined that since firewall APIs are not normally accessed by unprivileged users (and in controlled environment they are rarely accessed), false positives should not happen when such a honeypot is used.

```
@@ line diff @@ function nfnl_cthelper(struct net *net, struct sock *nfnl,
    struct nfnl_cthelper *nlcth;
    int ret = 0;
+   if (!capable(CAP_NET_ADMIN)) {
+       KHONEY_EVENT("Alert CVE-2017-17448");
+       return -EPERM;
+   }
    if (!tb[NFCTH_NAME] || !tb[NFCTH_TUPLE]) {
        return -EINVAL;
    }
```

Listing 1: Example Pseudocode for Honeypot Patch

Listing 1 shows example pseudocode of a honeypot patch configured to convert a software having or that had (i.e., associated with) a missing security capabilities check into a honeypot system by inserting into the nfnl_cthelper_new( ) function a conditional test (i.e., "if (!capable(CAP_NET_ADMIN))") that verifies the caller has the privileges (i.e., "CAP_NET_ADMIN") in the namespace that owns the netlink socket and a signaling instruction (e.g., KHONEY_EVENT("Alert CVE-2017-17448");") to be executed in response to the caller failing the verification, thereby turning the software into a form of a honeypot. In some aspects, the honeypot patch may be implemented on the level of a function, i.e., encompassing program code for a function intended to replace the program code of an entire function within the original code of the vulnerable software. In some aspects, the honeypot patch may be implemented as a delta calculated by a data comparison tool (e.g., diff).

As shown in FIG. 2B, the software update module 104 generates a honeypot patch 105 and modifies the (running) software using the honeypot patch 105 so as to convert the vulnerable software 200 into a honeypot system 210.

As shown in FIG. 2C, the honeypot system 210 may receive an attempt to exploit the software vulnerability, for example, from a malicious process 230 executing on the same computing system 100 or a different system (e.g., over a network). The exploit attempt may constitute the malicious process 230 executing a system call that invokes functionality of the (now-honeypot) software or by using other inter-process communication means. During its execution, the honeypot instance of the software executes the program code of the honeypot patch, including execution of the above-described conditional test instruction that resolves to "true" and triggers the security event to be generated (i.e., via KHONEY_EVENT( )). These security events are collected by the intrusion reaction module 106 as detected exploit attempts.

In one aspect, the detected exploit attempts are reported to the system administrator via notifications or by other means. In some aspects, the detected exploit attempts are proactively mitigated by killing and blocking intruder processes. In this example, the intrusion reaction module 106 may be configured to terminate the malicious process 230 and/or block future inter-process communications from that process 230. In some aspects, the intrusion reaction module 106 may be configured to, in response to detecting the exploit attempts, saves the state of the processes for further analysis. In some aspects, the intrusion reaction module 106 may be configured to, in response to detecting the exploit attempts, live migrate the processes associated with the attack or attacking user to an isolated system or virtual machine (for further analysis).

Another class of security issues that can be converted into honeypots is the issue of a lack of boundary checks in the software code, which often lead to buffer overflows or use-after-free events. In one aspect, the software update module 104 may generate a honeypot patch based on detection of the software 200 having or that had (i.e., associated with) a software vulnerability related to buffer overflows in the code of the software. In one example of such a vulnerability, a software vulnerability corresponding to the security bulletin CVE-2018-6927 exists with a certain version of the kernel 101 (e.g., version 4.14.15 of the Linux kernel), in which a certain system call (the futex_requeue function in kernel/futex.c) might allow attackers to cause a denial of service (integer overflow) or possibly have unspecified other impact by triggering a negative wake or requeue value. The software update module 104 may generate a honeypot patch that comprises computer-executable code that fixes this vulnerability by adding a conditional check or input validation for negative values and by adding signaling if a caller attempts to trigger a negative input value (e.g., negative wake value or requeue value).

```
@@ line diff @@ static int futex_requeue(u32 _user *uaddr1, int flags,
    ...
    struct futex_q *this, *next;
    DEFINE_WAKE_Q(wake_q);
+   if (nr_wake < 0 | | nr_requeue < 0) {
+       KHONEY_EVENT("Alert CVE-2018-6927");
+       return -EINVAL;
+   }
    ...
```

Listing 2: Example Pseudocode for Honeypot Patch

Listing 2 shows example pseudocode of a honeypot patch configured to convert a software having or that had (i.e., associated with) a buffer overflow or input overflow vulnerability into a honeypot system by inserting into the affected function (i.e., "futex_requeue( )") a conditional test to catch prohibited input values (i.e., negative values for wake and requeue) and a signaling instruction (e.g., "KHONEY_EVENT("Alert CVE-2018-6927");") to be executed in response to the caller failing the conditional test.

In another example, a software vulnerability corresponding to security bulletin CVE-2016-7913 exists within a certain version of an operating system (e.g., Linux kernel before version 4.6), in which a certain library function (e.g., the xc2028_set_config function in drivers/media/tuners/tuner-xc2028.c) allows local users to gain privileges or cause a denial of service (use-after-free flaw) via vectors involving omission of the firmware name from a certain data structure. In this case, the software update module 104 may generate a honeypot patch comprising computer-executable code that fixes this vulnerability by the inclusion of a check if the caller supplied an firmware_name argument is not an empty string, as shown in Listing 3 below.

```
static int xc2028_set_config(struct dvb_frontend *fe, void *priv_cfg) {
    ...
+   if (!firmware_name[0]) {                         // honeypot trigger
+       KHONEY_EVENT("CVE-2016-7913");               // honeypot signal
                                                     event to admin
    ...
}
```

Listing 3: Example Pseudocode for Honeypot Patch

In another example, an out-of-bounds-type software vulnerability such as that corresponding to security bulletin CVE-2017-17558 may exist within a certain version of the operating system, in which a certain library function (e.g., usb_destroy_configuration( ) function) in 'drivers/usb/core/config.c' in the USB core subsystem, does not consider the maximum number of configurations and interfaces before attempting to release resources. The software update module 104 may generate a honeypot patch comprising computer-executable code that fixes this vulnerability by the inclusion of an out of bounds check, as shown in Listing 4 below, thereby converting the software into a honeypot to catch caller that might otherwise to cause a denial of service, due to out-of-bounds write access, or possibly have unspecified other impact via a crafted USB device. Note though, that fixes to both CVE-2016-7913 and CVE-2017-17558 may not be limited to only checks similar to above honeypot ones, but also may include fixes done by clearing some cached value around in the code.

```
static int usb_parse_configuration(...) {
    ...
+   if (nintf > USB_MAXINTERFACES) {
+       KHONEY_EVENT("CVE-2017-17558");  // honeypot signal
                                          event to admin
+   }
    ...
}
```

Listing 4: Example Pseudocode for Honeypot Patch

Another class of issues with potential security implications is use-after-free type software vulnerabilities, which involves a malicious process attempting to access memory after it has been free, which can cause a program to crash or even execute arbitrary code. In one aspect, the software update module 104 may generate a honeypot patch that converts vulnerable systems into honeypots, which the patch includes computer-executable instructions to mark a given freed data structure by some "magic" values which are impossible to have normally (e.g. values not possible for pointer members like 0xDEADBEEF), and instructions to verify that the given data structure does not have this magic values upon access. As an example, the above-mentioned software vulnerability corresponding to security bulletin CVE-2016-7913, which results in an "use after free" error due to lack of input validation can be converted to a honeypot catching the exact "use after free" attempt, rather than malicious input as follows.

In an example of honeypot patch code, as shown in Listing 5 below, in the affected function xc2028_set_config( ) the one should set priv→ctrl.fname to 0xDEAD-BEEF right after memory was freed in kfree(priv→ctrl.fname) code line. Then in code where this variables is used it should be checked for the magic value, e.g. before passing to request_firmware_nowait( ) and other code lines:

```
static int xc2028_set_config(struct dvb_frontend *fe, void *priv_cfg) {
    ...
    kfree(priv->ctrl.fname);
+   priv->ctrl.fname = 0xDEADBEEF;
    ...
}
    ...
+   if (priv->ctrl.fname == 0xDEADBEEF)   // freed memory is to be accessed
+       KHONEY_EVENT("CVE-2016-7913");   // honeypot signal event to admin)
    <code accessing honeypot protected variable, e.g. priv->ctrl.fname)
    ...
```

Listing 5: Honeypot Patch for Use-After-Free Flaws

Another class of security issues which be converted into honeypots are race conditions. A race may occur when one or more actions are performed in parallel and result in unexpected behavior due to simultaneous poorly synchronized execution. Yet, even this class of issues can be used sometimes for honeypots, if the actions needed to trigger a race condition are never performed in normal applications. In one example of such a vulnerability, a software vulnerability corresponding to security bulletin CVE-2016-5195, sometimes referred to as "Dirty COW", in which a race condition exists in the way a Linux kernel's memory subsystem handled the copy-on-write breakage of private read-only memory mappings. The software update module 104 may generate a honeypot match that include computer-executable instructions to verify a set of conditions leading to page Copy-On-Write and its state, as shown in Listing 6 below. When used, the honeypot patch may convert a vulnerable system into a honeypot configured to catch attempts by an unprivileged, local user to exploit this flaw to gain write access to other read-only memory mappings, and thus increase their privileges on the system (privilege escalation).

```
+   if ((flags & FOLL_WRITE) && !pte_write(pte) &&
+       ((flags & FOLL_FORCE) && (flags & FOLL_COW) &&
        pte_dirty(pte))) {
+       KHONEY_EVENT("CVE-2016-5195");
+   }
```

Listing 6: Honeypot Patch for Race Conditions

Figure 3:
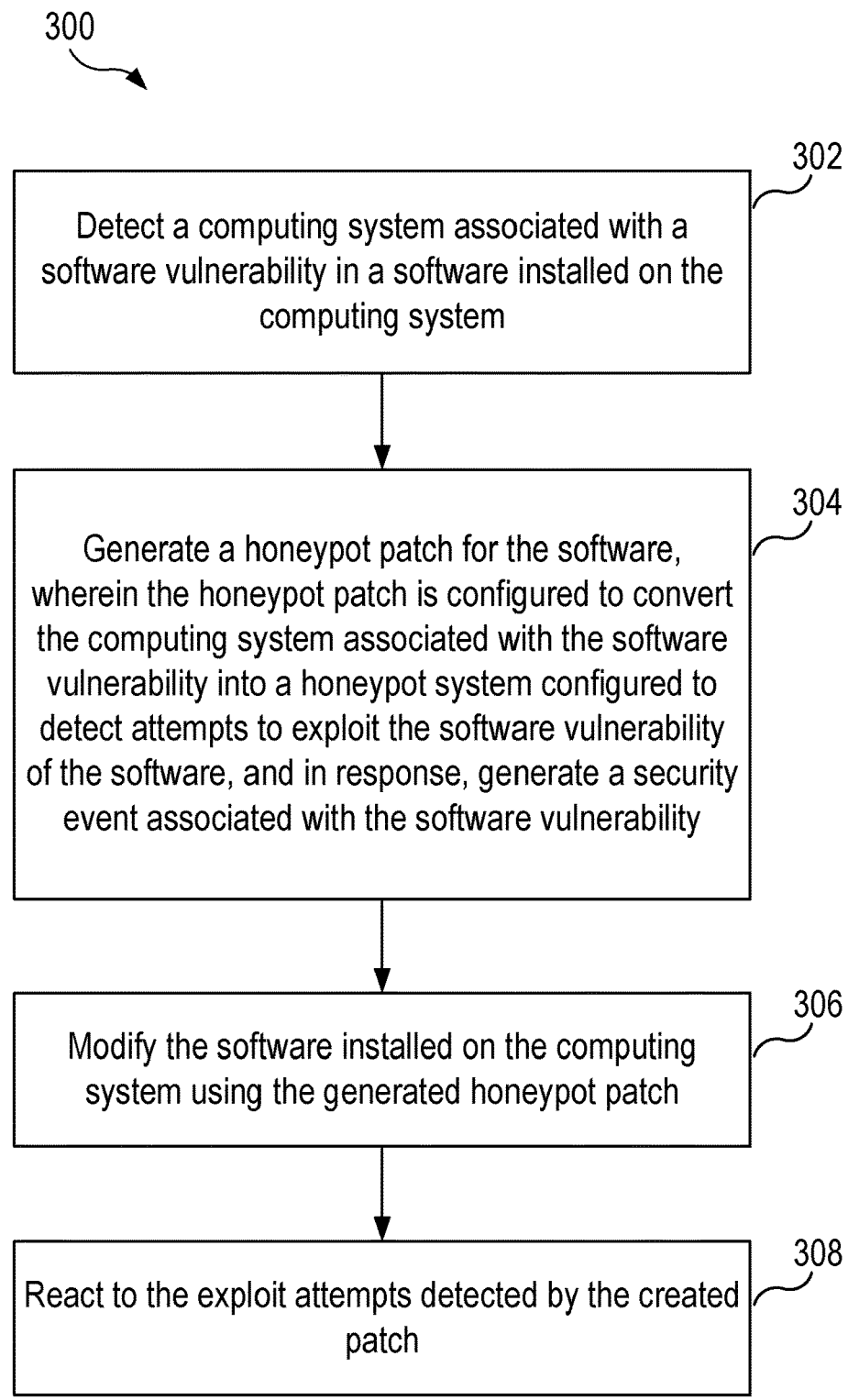
FIG. 3 is a flowchart illustrating a method for software intrusion detection according to an exemplary aspect.

FIG. 3 is a flowchart illustrating a method 300 for software intrusion detection according to an exemplary aspect. It is noted that the following description of the exemplary method makes reference to the system and components described above.

The method 300 includes block 302, in which the software update module 104 may detect a computing system associated with a software vulnerability in a software installed on the computing system. In some aspects, the particular instance of the computing system may currently have the software vulnerability, or in other cases, the computing system may have previously had the software vulnerability and was previously fixed, updated, or patched by a prior software update. Although a computer system may be already patched, a potential malicious actor may attempt to exploit a particular vulnerability any way (e.g., a hacker may try to exploit an array of MySQL database software exploits particularly if the hacker is unable to identify the particular version of MySQL database software that is running). In some aspects, the software may be a system application, a user-level application, an operating system, a kernel module, or some combination thereof. In some aspects, the software update module 104 may detect the computing system has an existing vulnerability based on a determination of whether a patch has been applied or a version number of the corresponding software application and/or operating system.

At block 304, the software update module 104 may generate a honeypot patch for the software. The honeypot patch is configured to convert the computing system having the software vulnerability into a honeypot system configured to detect attempts to exploit the software vulnerability of the software, and in response, generate a security event associated with the software vulnerability.

In one case, the honeypot patch may include computer-executable instructions configured to detect the attempt to exploit the software vulnerability of the software using a conditional test for verifying security capability to be inserted into the original source code of the software. In another scenario, the honeypot patch may include computer-executable instructions configured to detect the attempt to exploit the software vulnerability of the software using a conditional test for whether the attempt is to cause a buffer overflow. In another case, in which the software vulnerability is a memory use-after-free flaw, the honeypot patch may include computer-executable instructions configured to detect the attempt to exploit the software vulnerability of the software by: marking a data structure with a predetermined placeholder value; and verifying that the data structure does not contain the predetermined placeholder value. In another aspect in which the software vulnerability involves a race condition, the honeypot patch may include computer-executable instructions configured to detect the attempt to exploit the software vulnerability of the software using a set of conditional tests leading up to a page copy-on-write and its state.

At block 306, the software update module 104 may modify the software installed on the computing system using the generated honeypot patch. In some aspects, the software update module 104 may modify the software by modifying original source code of the software using the honeypot patch, and then restarting execution of the software using an executable created by re-compiling the modified source code. In other aspects that utilize hot patching techniques, the software update module 104 may generate a live patch based on the generated honeypot patch, wherein the live patch is configured to modify code of the software being executed without restarting the software.

At block 308, the intrusion reaction module 106 may react to the exploit attempts detected by the created patch (and modified software). In some aspect, the detected exploit attempts are reported to the system administrator via notifications or by other means. In some aspects, the detected exploit attempts are proactively mitigated by killing and blocking intruder processes. In some aspects, when exploit attempts are detected, the system saves the state of the processes for further analysis. In some aspects, when exploit attempts are detected, the processes associated with the attack or attacking user are transparently live migrated to an isolated system or virtual machines. In such aspects, the current or future connections from the attacking address are routed to the isolated system where the application has been migrated. In another aspect, the detected exploit attempts result in the blocking of the login of the user associated with the attack. In some aspects, the detected exploit attempts result in the blocking of network traffic (all or partial) from the original network address(es) associated with the attack.

In some aspects, the detected exploit attempts are faked to be successful to the attacker or even faked to gain the privileges. That is, the honeypot patch contains program code that configures the software behavior of the (resulting) honeypot system so as to simulate, act, and/or appear as if the attack was successful. For example, the honeypot system may report to the attacker that they received elevated privileges (but refrain from providing such privileges in reality). Or, in another example, the honeypot system may add additional privileges but isolate all the processes in some sandbox form (e.g., virtual machine system, container) to limit further attack vectors. As a result, the intruder will believe that they successfully penetrated the system, and spend additional time on (useless) activity with respect to the honeypot system.

Figure 4:
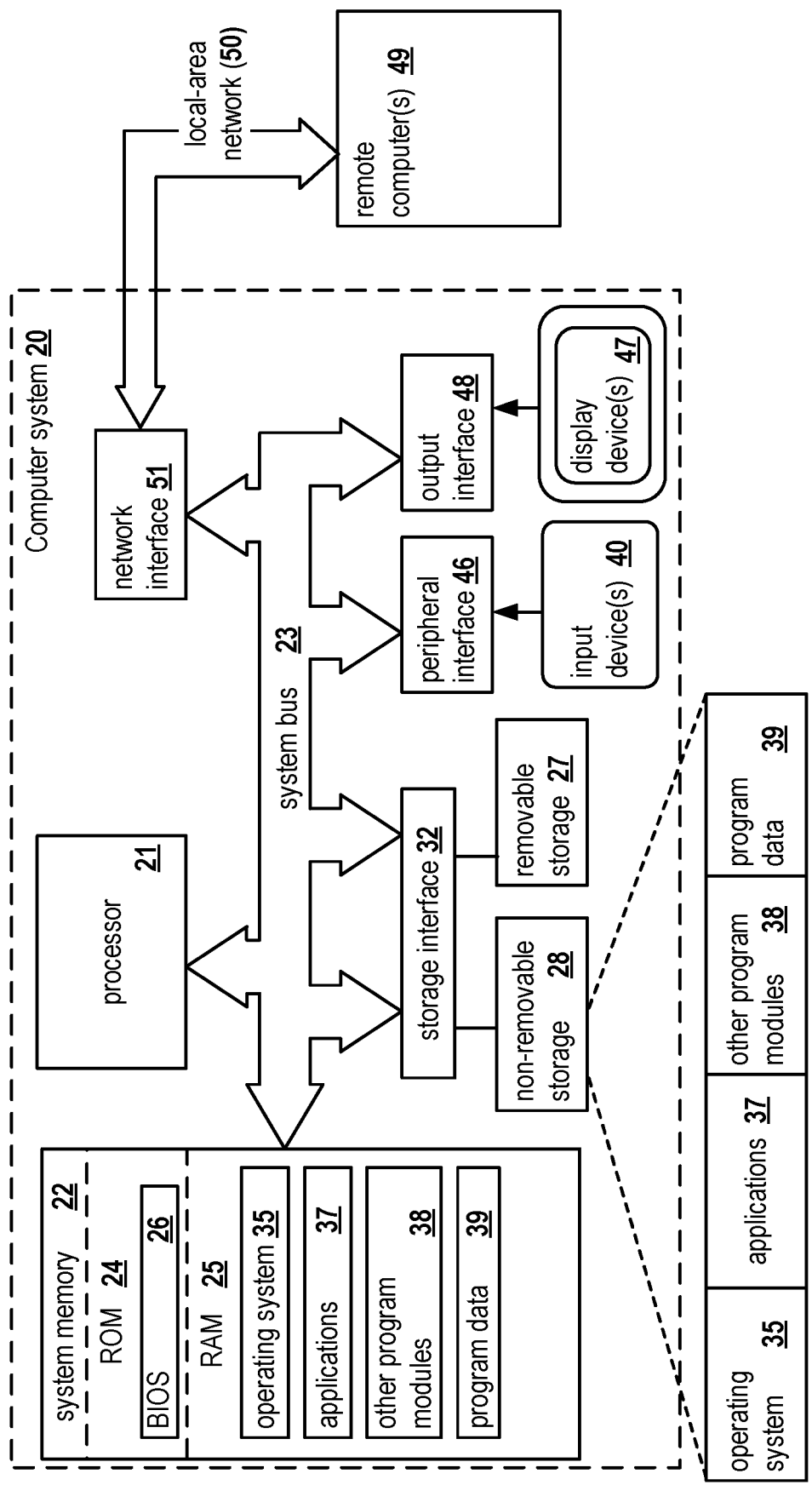
FIG. 4 is a block diagram of a computer system on which the disclosed system and method can be implemented according to an exemplary aspect.

FIG. 4 is a block diagram illustrating a computer system 20 on which aspects of systems and methods for software intrusion detection may be implemented in accordance with an exemplary aspect. It should be noted that the computer system 20 can correspond to the computing system 100, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for software intrusion detection, comprising:

generating a honeypot patch for a computing system associated with a software vulnerability in a software installed on the computing system, wherein the software comprises at least one of an application and an operating system, wherein the honeypot patch is configured to convert the computing system associated with the software vulnerability into a honeypot system by modifying code of the software running on the computing system using the generated honeypot patch without restarting the software, wherein the generated honeypot patch is a live patch that updates the code of the software without interruption in execution of the software, and wherein the honeypot system is configured to detect attempts to exploit the software vulnerability of the software, and in response, generate a security event associated with the software vulnerability.

2. The method of claim 1, wherein the honeypot patch comprises computer-executable instructions configured to detect the attempt to exploit the software vulnerability of the software using a conditional test for verifying security capability to be inserted into the original source code of the software.

3. The method of claim 1, wherein the honeypot patch comprises computer-executable instructions configured to detect the attempt to exploit the software vulnerability of the software using a conditional test for whether the attempt is to cause a buffer overflow.

4. The method of claim 1, wherein the software vulnerability comprises a memory use after free vulnerability.

5. The method of claim 4, wherein the honeypot patch comprises computer-executable instructions configured to detect the attempt to exploit the software vulnerability of the software by:

marking a data structure with a predetermined placeholder value; and verifying that the data structure does not contain the predetermined placeholder value.

6. The method of claim 1, wherein the software vulnerability comprises a race condition.

7. The method of claim 6, wherein the honeypot patch comprises computer-executable instructions configured to detect the attempt to exploit the software vulnerability of the software using a set of conditional tests leading up to the race and software state manipulation.

8. The method of claim 1, wherein the honeypot system configured to detect attempts to exploit the software vulnerability of the software is further configured to report the exploit attempts to a system administrator via a notification.

9. The method of claim 1, wherein the honeypot system is further configured to, in response to detecting attempts to exploit the software vulnerability of the software, kill and block intruder processes.

10. The method of claim 1, wherein the honeypot system is further configured to, in response to detecting attempts to exploit the software vulnerability of the software, save a state of processes running on the honeypot system for further analysis.

11. The method of claim 1, wherein the honeypot system is further configured to, in response to detecting attempts to exploit the software vulnerability of the software, live migrate processes associated with the detected attack to an isolated system or a virtual machine.

12. The method of claim 11, wherein current or future connections from an attacking address are routed to the isolated system or the virtual machine where the processes were migrated.

13. The method of claim 1, wherein the honeypot system is further configured to, in response to detecting attempts to exploit the software vulnerability of the software, block a login of a user associated with the detected attack.

14. The method of claim 1, wherein the honeypot system is further configured to, in response to detecting attempts to exploit the software vulnerability of the software, block at least a portion of network traffic from an original network address associated with the detected attack.

15. The method of claim 1, wherein the honeypot system is further configured to, in response to detecting attempts to exploit the software vulnerability of the software, fake to the attacker that the detected attack was successful.

16. A system for software intrusion detection, comprising:
a hardware processor configured to:
generate a honeypot patch for a computing system associated with a software vulnerability in a software installed on the computing system, wherein the software comprises at least one of an application and an operating system, wherein the honeypot patch is configured to convert the computing system associated with the software vulnerability into a honeypot system by modifying code of the software running on the computing system using the generated honeypot patch without restarting the software, wherein the generated honeypot patch is a live patch that updates the code of the software without interruption in execution of the software, and wherein the honeypot system is configured to detect attempts to exploit the software vulnerability of the software, and in response, generate a security event associated with the software vulnerability.

17. A non-transitory computer readable medium comprising computer executable instructions for software intrusion detection, including instructions for:

generating a honeypot patch for a computing system associated with a software vulnerability in a software installed on the computing system, wherein the software comprises at least one of an application and an operating system, wherein the honeypot patch is configured to convert the computing system associated with the software vulnerability into a honeypot system by modifying code of the software running on the computing system using the generated honeypot patch without restarting the software, wherein the generated honeypot patch is a live patch that updates the code of the software without interruption in execution of the software, and wherein the honeypot system is configured to detect attempts to exploit the software vulnerability of the software, and in response, generate a security event associated with the software vulnerability.

* * * * *